United States Patent [19]
Scott et al.

[11] 3,781,782
[45] Dec. 25, 1973

[54] DIRECTIVE ACOUSTIC ARRAY FOR NOISE SOURCE LOCALIZATION

[75] Inventors: Paul F. Scott, Schenectady, N.Y.; Kenneth P. Radecki, Cincinnati, Ohio; Robert B. Tatge, Scotia, N.Y.

[73] Assignee: General Electric Company, Schenectady, N.Y.

[22] Filed: Oct. 20, 1972

[21] Appl. No.: 299,445

[52] U.S. Cl............... 340/16 R, 73/70, 181/0.5 AP, 340/6 S
[51] Int. Cl............................................. G01s 3/80
[58] Field of Search................... 340/6 R, 6 S, 16 R; 181/0.5 AP, 0.5 ED; 179/1 DM; 73/67.2, 69, 70, 116, 70.4

[56] References Cited
UNITED STATES PATENTS
3,127,767   4/1964   Kamp...................................... 73/69
3,364,461   1/1968   Trott................................ 340/6 M

*Primary Examiner*—Richard A. Farley
*Attorney*—John F. Ahern

[57] ABSTRACT

A highly directive, curved broadside array and method for its use to measure noise originating in a localized region of a complex extended noise source such as a jet engine. The array is mounted for scanning at a predetermined range distant from the source, and comprises a single row of microphones with a curvature conforming to the wavefronts of the spherical sound waves in the far field. The received signals are preferably summed, with shading if desired for increased side lobe suppresion, and bandpass filtered to extract broadband noise and pure tones. A technique for minimizing the number of microphones is given.

18 Claims, 10 Drawing Figures

DIRECTIVE ACOUSTIC ARRAY FOR NOISE SOURCE LOCALIZATION

BACKGROUND OF THE INVENTION

This invention relates to a method and apparatus for locating the specific region of an extended complex acoustical source from which a given noise originates. More particularly, the invention relates to a curved directive acoustic array and the method for using such an array to localize individual noise sources in an extended complex noise source such as a jet engine.

A large engine or piece of machinery is not one acoustical source, but many. In the case of a twenty foot long jet engine, the most important noise sources are the compressor, the front and rear sides of the fan, the casing, and the jet itself. The noise of a jet engine is commonly measured using a distant microphone or microphone array that is both many wavelengths and many source-dimensions away from the engine. While the measurement of engine noise at various azimuth angles defines the sound field so as to permit prediction of the subjective response of a human listener, it is not adequate to define the specific point or points from which particular sounds originate. This is needed to design quieter jet engines.

SUMMARY OF THE INVENTION

In accordance with the invention, a curved broadside acoustical array comprising a single row of equally spaced electroacoustic transducer elements is used as a highly directive array to measure noise originating in a localized region of a complex extended noise source. The array is mounted at a predetermined range from the array, and has a curvature conforming to the curvature of the wavefronts of the far field sound waves incident on the array. Thus the sensed sounds are in phase despite the fact that the range is not large compared to the array length. More particularly, the curvature is defined by an arc of a circle with a radius equal to the range. The transducer elements are typically matched omnidirectional or directional microphones. An electronic circuit processes the microphone signals and produces an output indicative of the noise originating in the localized region of the source. The electronic circuit in one embodiment has a summing circuit for adding all the signals and in another embodiment has two summing circuits for obtaining the sums of the signals generated by each half of the array, which are then multiplied together. The microphone signals may, if desired, be attenuated by variable amounts to achieve a shaded array with increased side lobe suppression. Bandpass filters are usually provided to extract selected frequency ranges to detect and measure pure tones as well as broad band noise.

Equations for calculating the length of the array and a minimized number of microphones are given. The latter is based on the premise that spurious major lobes in the directivity pattern are not sensed when they are at angles not subtended by the source, as seen from the array. In the method of using the array, it is preferably pivoted about the array axis to scan the longitudinally extended noise source to measure the noise at other localized regions or points. The entire array can also be physically moved to measure the noise at different angular positions with respect to a chosen localized noise source.

DESCRIPTION OF THE PREFERRED EMBODIMENTS

Figure 1:
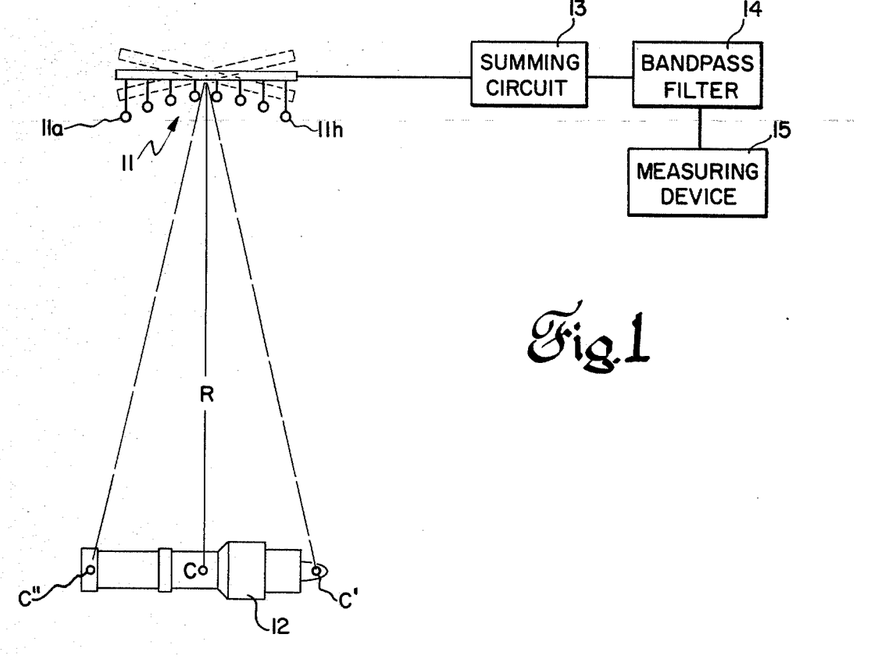
FIG. 1 is a diagram of a curved broadside microphone array being used to measure the individual noise sources at various locations along a jet engine or other extended noise source, showing in simplified block diagram form the electronic circuitry for processing the received signals.

Referring to FIG. 1, a highly directional broadside acoustical array 11 constructed in accordance with the invention is comprised by a single curved row of microphones or other electroacoustical transducers 11a through 11h. The microphones are matched as to both phase and gain and can be omnidirectional or directional microphones. Curved broadside microphone array 11 is mounted at a distance R, hereafter referred to as the range or range radius, from a longitudinally extending complex noise source 12, such as a jet engine. The array is curved to conform to an arc of a circle having the radius R whose center C is approximately midway between the two ends of the extended noise source 12. The range R has a value such that the array is in the far field but is sufficiently close to the source, for example, about 100 feet, that the wavefront of the sound waves incident upon array 11 are spherical rather than plane. Since the curvature of the array conforms to the curvature of the sound wavefronts, the array is usable only at the range R or the approximate range in view of the depth of "focus" of the curved array. The signals received by the matched individual microphones 11a through 11h accordingly are in phase. When operated as an additive mode system, the received signals are summed by a suitable summing circuit 13. At a subsequent point in the analysis of the received data, the resulting sum signal is passed through a bandpass filter 14 which rejects all frequencies except those of interest. The filter output is indicated by a suitable measuring device 15 such as an a-c voltmeter.

As has been mentioned, a jet engine is a complex noise source made of a number of different individual noise sources at different longitudinal locations in the engine. The broadband noise level produced by localized regions of the engine, and also the level of pure tones produced by the localized region, are of interest to permit the design of quieter engines. The ability to measure the sound pressure levels produced by localized regions of the engine can also be used to evaluate the effect of acoustical treatment applied to remedy noisy operation. The discrete frequency tones are produced, for example, by a fan with a known number of blades rotating at a given rpm. The portion of the sonic spectrum of interest for the localization of jet engine noise is typically 400–10,000 Hz. As will be further explained, curved microphone array 11 is designed for a selected range of frequencies, and can be used over the entire range or a selected portion of it containing the frequencies of greatest interest. In the full line position of curved array 11, as shown in FIG. 1, the directional properties of the array are such that the system measures the noise originating in the region about point C and, when properly designed, suppresses noises originating from other locations in extended source 12. To measure the noise originating from other localized regions of the sound source, the source is scanned preferably by rotating or pivoting microphone array 11 about its axis. The dashed line representations show the respective positions of the array when measuring noise originating in the regions about the points C' and C'' at either end of source 12.

Figure 2:
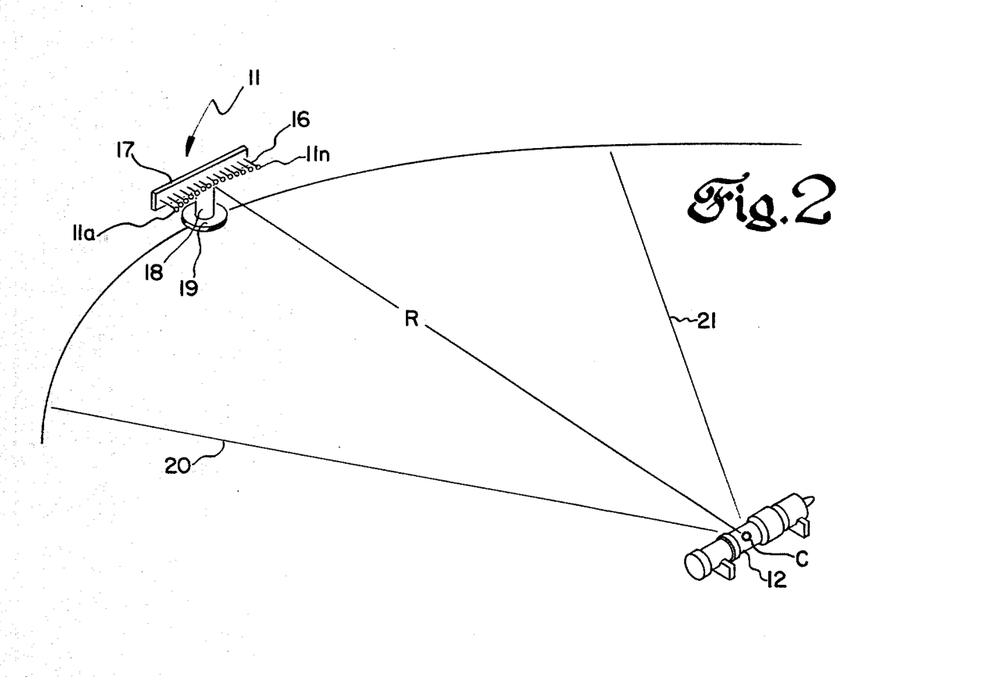
FIG. 2 is a simplified perspective view of the curved microphone array and jet engine of FIG. 1 illustrating the option of taking further measurements with the array at different positions along the circle with a radius equal to the range R.

FIG. 2 shows a typical setup for use of curved broadside microphone array 11 for jet engine noise localization. Each of the microphone elements 11a to 11n is mounted on a support post 16 projecting orthogonally from a straight or plane mounting beam 17. The surface of mounting beam 17 can be treated with acoustic absorptive material to reduce sound reflections detected by microphones. The center of the mounting beam is attached to a rotatable turntable and post arrangement 18, which can if desired be supplied with a sighting mechanism to assure accurate alignment with a specific point on extended source 12. Post 18 is carried by a wheeled base 19. In addition to or in place of angular scanning as described, the entire array and its mounting structure can be moved parallel to the longitudinal axis of extended source 12 or on a circle about a selected point. In the case of a jet engine, additional noise sources exist due to the turbulent air flow several feet from the inlet and jet ends of the engine, and it is desirable to measure the noise produced by these regions of the total noise source. A typical set of measurements is made by placing the array at the 90° position as shown in FIG. 2 and then pivoting the curved microphone array to scan a given number of points along the engine 12 and the air streams at either end. The entire array and its mounting structure is moved approximately equidistant from a selected point on the engine to the left by 10° increments to a limiting position of about 50° as indicated by the line 20, and to the right by increments to a limiting position of about 130° as indicated by the line 21. At each position the curved microphone array is pivoted to scan the same set of points on the engine 12 and the air streams at either end.

Figure 3:
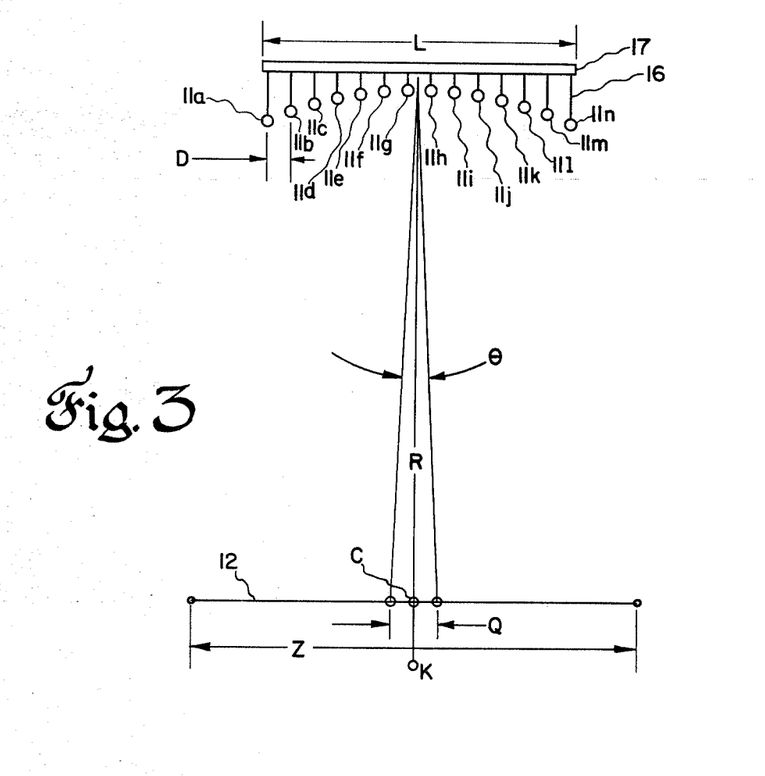
FIG. 3 is a schematic diagram similar to FIG. 1, with the jet engine represented by a line of length Z, and other points and dimensions shown to facilitate selection of the array parameters.
Figure 4:
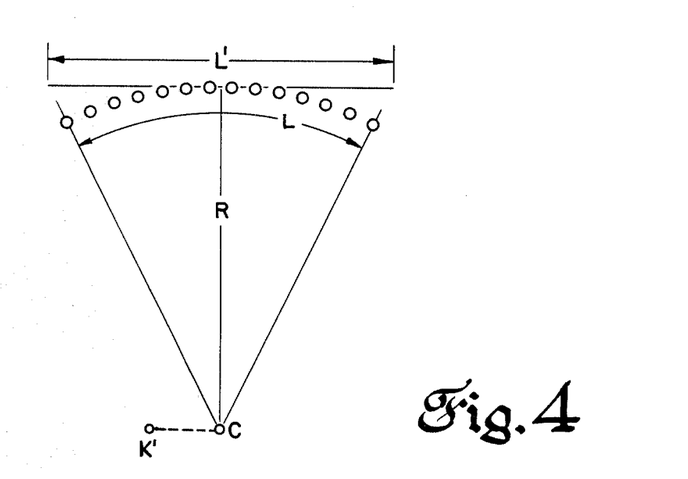
FIG. 4 is a sketch used to explain discrimination by the curved array of noise originating at points displaced from the center-point C.

The acoustical characteristics of curved broadside array 11, for a particular sonic frequency or range of frequencies, is determined and varied by proper selection of the physical parameters of the array and the range R at which the array is used. Another determining factor is the lateral dimension of the localized regions of the extended complex source which are to be separately measured. Aside from the unique application of the acoustical array, novel features are a construction which permits the array to be used when the distance from the source to the array is not extremely large relative to its length, and the minimization of the number of microphones or other transducer elements incorporated in the array. The physical dimensions and angles used in the pertinent equations defining the system are shown in FIGS. 3 and 4. The extended complex noise source is represented as a line and has a total length Z. The distance Q is the distance between two sources which are to be separately measured at the range R, and corresponds to the lateral dimension of the localized source region being examined. The angle $\theta$ defines the beam width of the array and, for a range R that is large compared to Q, is approximately equal to Q/R in radians. The array length L is approximately the linear distance between the first and last transducer elements in the curved array, and the distance between the equally spaced elements is D. A more precise definition of the array length L is depicted in FIG. 4. The equations and graphs to be presented are derived from known information on linear acoustical arrays, that is, arrays in which the equally spaced transducer elements are arranged along the line of length L' whose midpoint is tangent to the range radius R. The equivalent curved array 11 distinguishes from the linear array in that the path length from each element to the center point C, and hence the phase of the sound waves, are equal. The criterion as to whether a curved array is required, assuming a phase error of no greater than $\pi/4$ radians at the ends of the array is given by the following formula:

$$L_{max} \sim 33.6 \sqrt{F/f},$$

(1)

where $L_{max}$ and R are in feet. If the linear array length is greater than this criterion permits, its performance is not adequate for the purpose of localizing a particular source of noise in an extended complex noise source.

Figure 5:
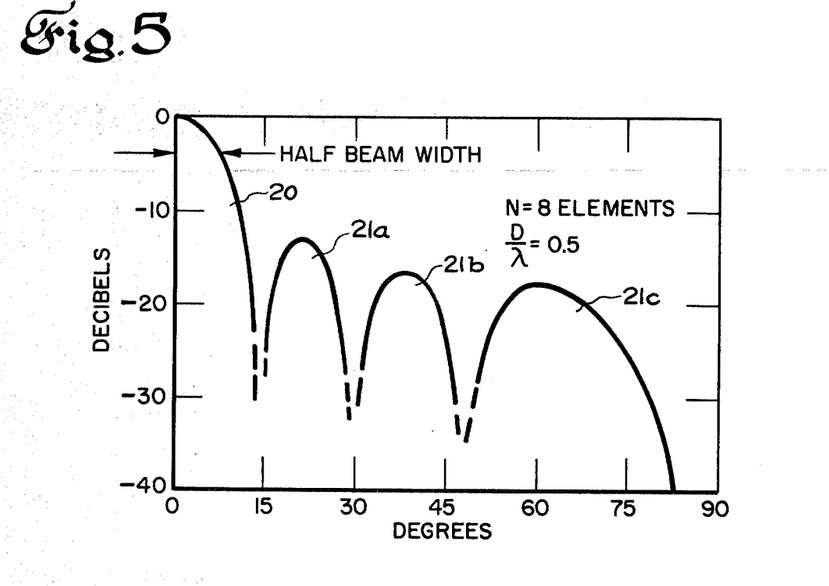
FIGS. 5 and 6 are typical directivity patterns for linear microphone arrays to aid in understanding the discussion of array performance as to noise originating at different angles from the array axis.
Figure 6:
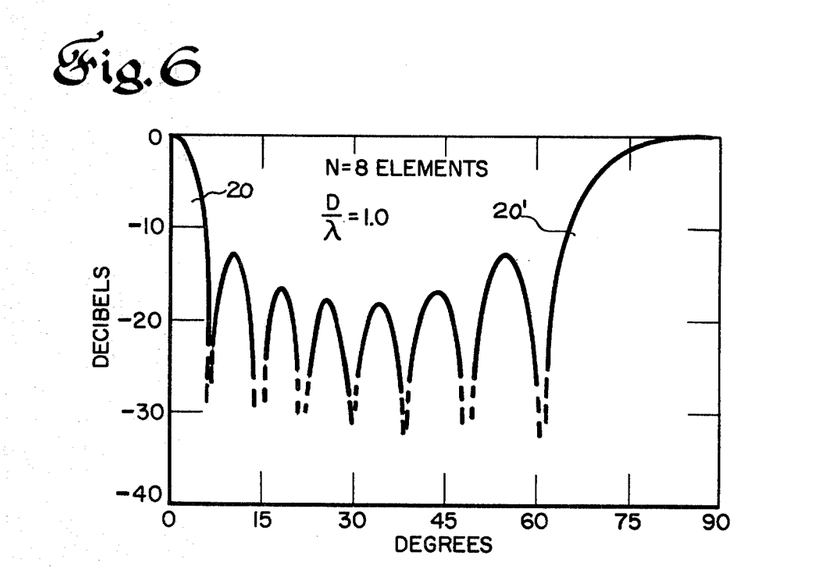

To aid in understanding the performance and equations of the curved array, reference is made to the typical directivity patterns shown in FIGS. 5 and 6 for a linear array of equally spaced omnidirectional microphones, each with unit sensitivity, the outputs being added. The particular case of an array with eight microphones ($N = 8$ elements) is illustrated. The response in decibels is given for an infinitely distant noise source as the array is pivoted about the array axis between 0° and 90° relative to the source. The patterns in the other quadrants are readily found because of symmetry. The spacing of the elements in FIG. 5 is $D/\lambda = 0.5$, while in FIG. 6 the spacing is $D/\lambda = 1.0$, where $\lambda$ is the wavelength of the sound waves. The half beam width of the major lobe 20 in FIG. 5 is indicated, i.e., the angle corresponding to the half power or −3dB point. It is to be observed that the amplitude of the three side lobes 21a and 21c is − 13dB or less. At the increased element spacing shown in FIG. 6, the significant thing, other than the reduced beam width and greater number of side lobes, is that there is a second or spurious major lobe 20' whose amplitude is equal to that of the previously mentioned major lobe 20. The selection of an array configuration with a directivity pattern that includes such a spurious major lobe is, of course, to be avoided due to the possibility of erroneous results. As is explained later, an array can have a spurious major lobe provided it falls outside the extent of the sound source. In such linear arrays with a variable number of elements at a variable spacing, the amplitude of the first side lobe is about −13dB if there are more than four elements in the array. When the element spacing is less than about 0.75 wavelength, the amplitude of succeeding side lobes tends to decrease. With larger spacing there tends to be a second major lobe or lobes. It is apparent that narrow beam width is essential to separate sources which are close together while low side lobes may be required so that the energy received by the main beam is large relative to that received by the side lobes.

The derivation of the equation applicable to the curved broadside array 11 which relates the total array length L, the range R, and the source separation Q will now be given. The function of the curved directive array, as is true of any directive array, is to provide discrimination against interfering signals. The desired signals to be measured originate in the localized region of the extended noise source with the lateral dimension Q, whereas interfering signals are produced by other regions of the extended source. The interfering signals add to the desired signal to introduce error which is a function of both their relative amplitudes and phases. The interfering signal may be in phase with the desired signal, out of phase, or have random phasing. If the maximum error is to be 2dB, regardless of phasing, the interfering signal should be at least −13dB below the desired signal. As was stated, the beam width of the array assuming that R is large compared to Q, is approximately Q/R radians. In degrees, $$\theta_{BW} = 180/\pi \; Q/R$$

(2)

Figure 7:
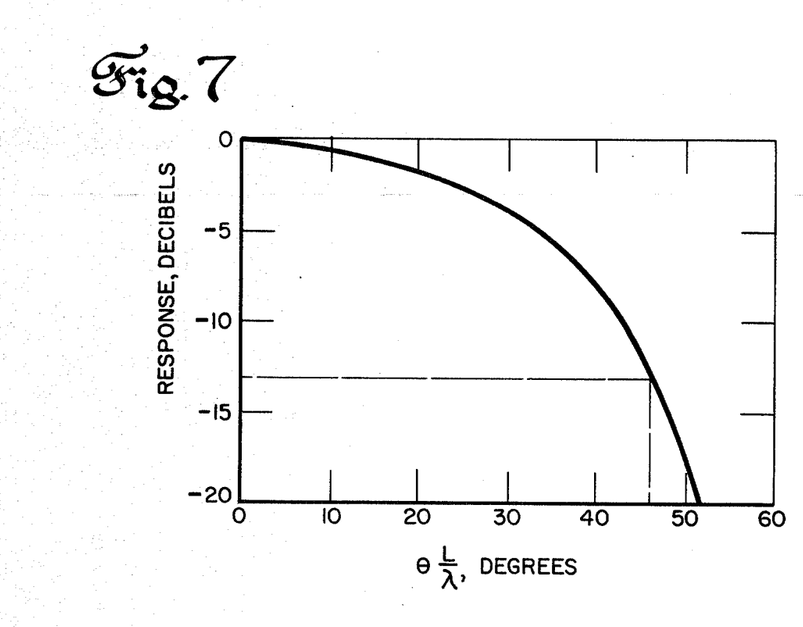
FIG. 7 shows a curve representing the approximate main beam directivity for any long broadside array, and is used in the derivation of the equation for array length L.

The curve shown in FIG. 7 is a reasonably good approximation to the directivity of the main beam of any long broadside array with the assumption that the main beam is narrow. It shows that the response will be down 13dB when $\theta L/\lambda$ is about 46. Substituting for $\theta$ from equation (2), the total array length required is approximately $$L = 0.8R\lambda/Q$$

(3)

In this equation L, R, λ, and Q are in feet.

The second equation of major importance to the curved broadside array relates the number of transducer elements N, the total source length Z, and the range R. The number of elements required is obtained by dividing the array length L by the element spacing D. For an array configuration that allows no side lobes greater than −13dB, the element spacing should not exceed 0.75λ. Knowing the array length and the frequency or range of frequencies to be covered, this is one way of calculating the number of transducer elements. However, a much greater element spacing may be practical for many applications and results in a more economical arrangement since fewer elements are needed. The key to minimizing the number of elements is recognition of the fact that spurious major lobes (such as side lobe 20', FIG. 6) will cause no trouble if they are at angles not subtended by the source as seen by the array. That is, there is only one major lobe within the angle of the source, defined as Z/R radians.

The sound field patterns of the uniform linear array described in connection with FIGS. 5 and 6 is given as:

$$F(\theta) = \sin(N\pi D/\lambda \; \sin\theta)/\sin(\pi D/\lambda \; \sin\theta) \sin \omega t$$

(4)

where $\theta$ is the angle between the direction of travel of a received plane sound wave and a perpendicular to the array. This array has a unity response where $\sin\theta = 1/(D/\lambda)$. Let this response be termed a spurious major lobe, which should completely be outside the angular arc subtended by the source. This spurious major lobe has a null when $$\sin\theta = (N-1)/N/(D/\lambda)$$

(5)

The length of the array in wavelengths, $L/\lambda$, is $(N-1)D/\lambda$. Substituting for $D/\lambda$ in equation (5), $$\sin\theta = (N-1)^2/NL/\lambda$$

(6)

This may be closely approximated as:

$$N = L/\lambda \; Z/R + 2$$

(7)

Equations (3) and (7) may be used to design a highly directional curved broadside array. Such an array has a depth of "focus" equivalent to the depth of field of an optical lens. This is illustrated in FIG. 3, in which the point K is on the acoustic axis of the array but at an improper distance. If the phase error at the ends of the array is not to exceed $\pi/4$, it can be shown that $$K \leq 1130/f \; R^2/L^2 \text{ feet.}$$

(8)

FIG. 4 shows a noise source K' off-set to one side of the center-point or "focus" C. It can be shown that the main beam would be effectively rotated toward an off-axis source with the result of broadening the main beam. The degree of rotation, however, is small compared to the beam width and does not cause significant errors.

Figure 8:
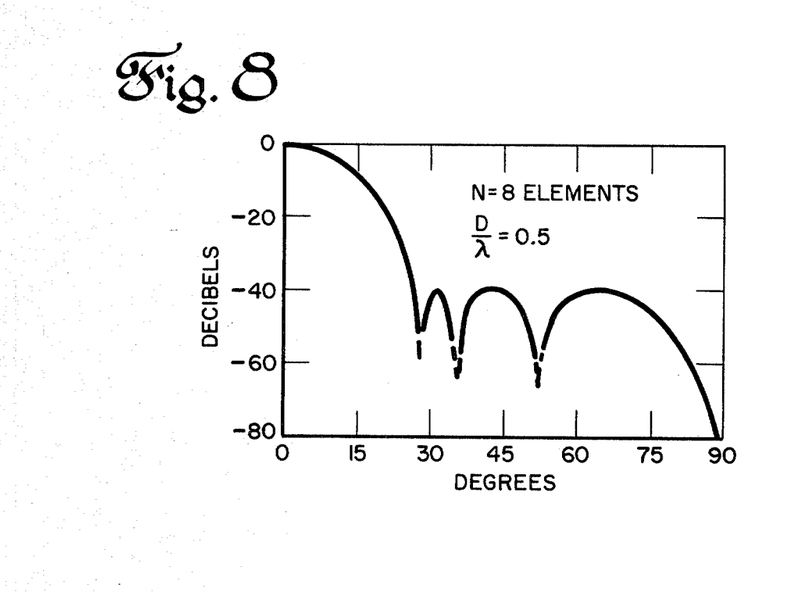
FIG. 8 is an array directivity pattern similar to FIGS. 5 and 6 for the case of a shaded array with side lobe suppression.

In the previous discussion, it was assumed that the individual transducer elements in the curved broadside array had equal unit sensitivities, and was thus an unshaded array. The off-axis rejection of an unshaded array may not be adequate in some cases. This is especially true when interfering noise sources are of similar or greater amplitude than the source on which the array is trained. In a shaded broadside array, all the elements are operated in phase but their sensitivities are varied. The resulting side lobe suppression is shown in FIG. 8, which has −40dB suppression. In appropriate cases, curved array 11 can be implemented as a shaded array, although at the expense of some broadening of the beam width. The Dolph-Tchebyscheff and Taylor methods can be employed, as well as other techniques, for shading or tapering the curved broadside array 11. The former is described in detail in the book, "Underwater Acoustics - II" by Vernon M. Albers, The Pennsylvania State University Press, copyright 1965, Library of Congress Catalog Card No. 64–15069.

A specific embodiment of the invention will now be described for utility in studying the contribution of various noise sources in a jet engine or other longitudinally extended noise source. In particular, the noise produced by the fan is measured, which in one engine 16 feet long has a diameter of about 7 feet. The principle range of frequencies that are evaluated is 2,000 Hz to 5,000 Hz, although the capability of the array can be extended to below 1500 Hz and above 6,000 Hz. At 2,000 Hz the wavelength in feet is $\lambda = 0.56$ feet, while at 5,000 Hz, $\lambda = 0.22$ feet. Referring to FIGS. 2 and 3, the array length $L = 14$ feet, the range $R = 100$ feet, the source separation distance $Q = 2$ feet, the total source length $Z = 20$ feet, and the number of microphones $N = 14$ at a spacing $D = 12.215$ inches. With these array parameters, the beam width $\theta_{BW} = \sin^{-1} 2/100 = 1°$. From equation (3), assuming that $R$, $Q$, and the wavelength $\lambda$ are established first, it is seen that the lowest frequency of the range being covered determines the length of an array with a given beam width. From equation (7), it follows that the highest frequency determines the number of elements. Also at the lowest frequency the beam width is the widest and at the highest frequency the distance between major lobes is the shortest. The first spurious major lobe is found to be approximately 20 feet to either side of the array axis on a line normal to this axis, or at any angle of 11°. Since the sources of noise in a jet engine are near the same amplitude, it is advantageous to obtain as much side lobe suppression as possible. The Dolph-Tschebyscheff method is used in the electronic circuit shown in FIG. 9 for processing the microphone outputs by addition of all the received signals, selectively attenuated by predetermined amounts to obtain the shaded, curved array.

Figure 9:
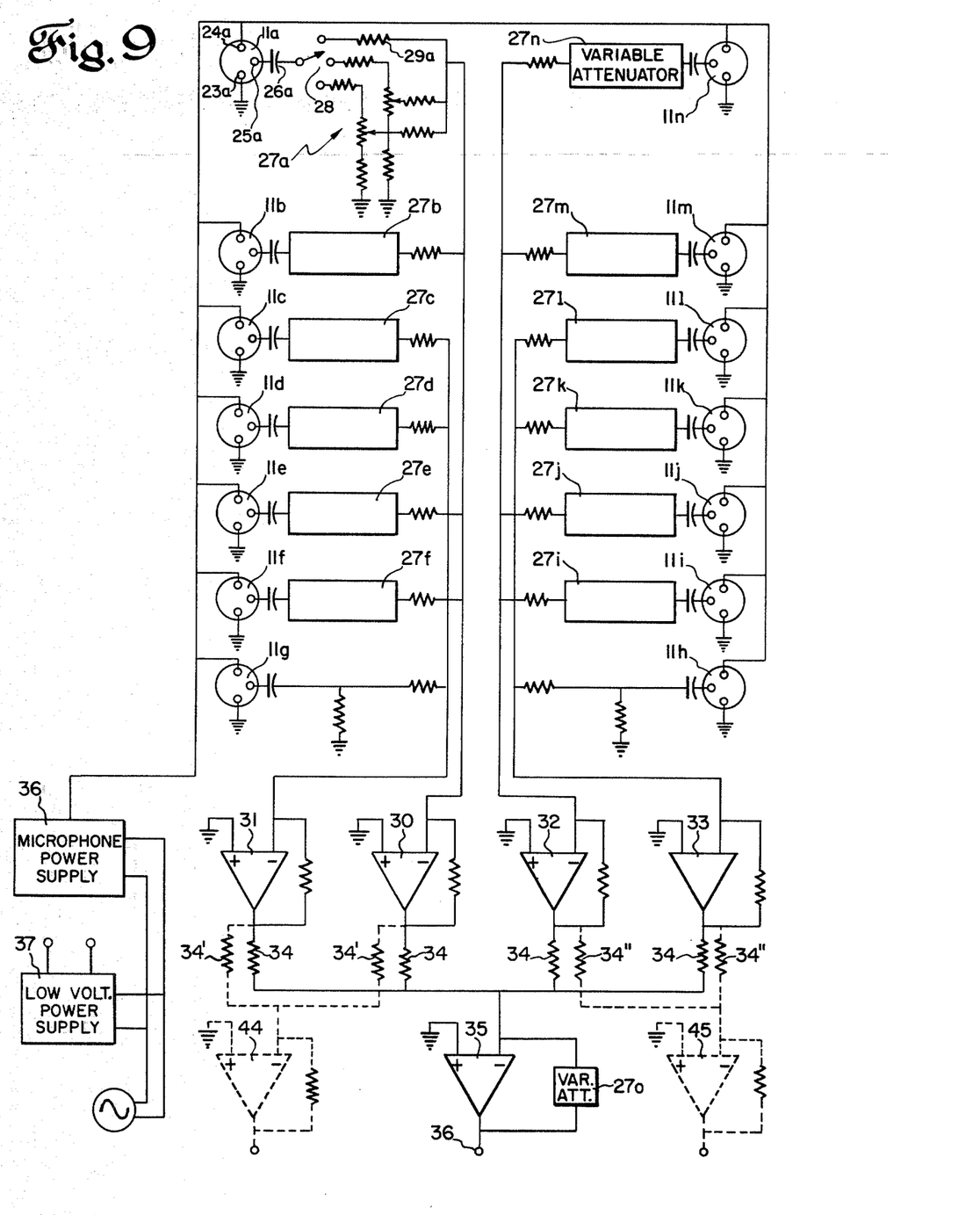
FIG. 9 is a schematic circuit diagram, partly in block diagram form, of an electronic circuit for processing the received signals by summation of all the individual microphone signals.

In FIG. 9 the fourteen microphones $11a$ to $11n$ are matched omnidirectional capacitor or condenser microphones. Above 3,000 Hz capacitor microphones are preferred since their amplitude and phase characteristics are more closely controlled, and below about 3,000 Hz the array elements may be dynamic microphones. The array is preferably split into two halves of seven microphones each, since this increases the signal processing options without increasing the size and cost of the array, as will be discussed later with regard to FIG. 10. Looking at microphone $11a$ as being representative, a polarizing voltage is applied between terminals $23a$ and $24a$, and the received signal representative of the sensed sound pressure levels is obtained at output terminal $25a$. The received signal is coupled by a coupling capacitor $26a$ to a variable attenuator circuit $27a$. A three-position selector switch 28 is manually actuated to select among the three branches of the attenuator, according to whether an unshaded array is desired, a shaded array with $-30$dB side lobe suppression, or a shaded array with $-40$dB side lobe suppression. For the case of an unshaded array there is no attenuation of the output signal and the resistor $29a$ is the input resistor for a summing circuit using standard integrated circuit operational amplifiers. The other attenuator branches are simple voltage dividers with one adjustable potentiometer likewise connected to a summing circuit input resistance. For 31 30dB side lobe suppression, the microphone channel gain is 0.276, and for $-40$dB suppression the gain is 0.114. The gains of the microphone channels on each half of the array are symmetrical, increasing from the two ends toward the center. The two center channels with microphones $11g$ and $11h$ are unattenuated and have a theoretical gain of 1.0.

On the left side of the array, the output of the channels with microphones $11a$, $11b$, $11e$, and $11f$ are applied to the inverting input of a first operational amplifier 30 connected in the summing configuration with a feedback resistor. The outputs of the other three channels with microphones $11c$, $11d$, and $11g$ are similarly applied to the inverting input of a second operational amplifier 31 connected in the summing configuration. On the right side of the array the outputs of the corresponding groups of four microphone channels and three microphone channels are summed by the respective operational amplifiers 32 and 33. To sum all fourteen microphone channels, the outputs of operational amplifiers 30-33 are respectively connected through individual input resistors 34 to the inverting input of another operational amplifier 35 connected in the summing configuration. The feedback path of this summing circuit includes a variable attenuator $27o$ which is similar to the other variable attenuators in the microphone channels and is provided to adjust the gain for the three signal processing selections. To complete the description of the electronic processing circuit, a microphone power supply 36 is provided and also a low voltage power supply 37 for the summing amplifiers, both energized by a commercially available 60 Hz, 120 volt source. It is seen that the sum signal at the output terminal 36 of the electronic processing circuit represents the summation of the received signals of all 14 microphones, either unattenuated for an unshaded array or individually attenuated by the proper amount for a shaded array.

The output of the entire array is preferably recorded and than further processed using a bandpass filter (see FIG. 1) to extract the sonic frequencies of interest. The broadband noise level is usually of greatest interest over the range of 2,000–5,000 Hz or the extended range of about 1,500–6,000 Hz. It is also desirable to process the sum signal for pure tonal energy as previously discussed. For this purpose, a narrow-band analyzer can be used to examine the entire spectrum incrementally by 20 cycle bandwidths. The output of these filtering operations is an a-c voltage which can be measured by an a-c voltmeter.

Figure 10:
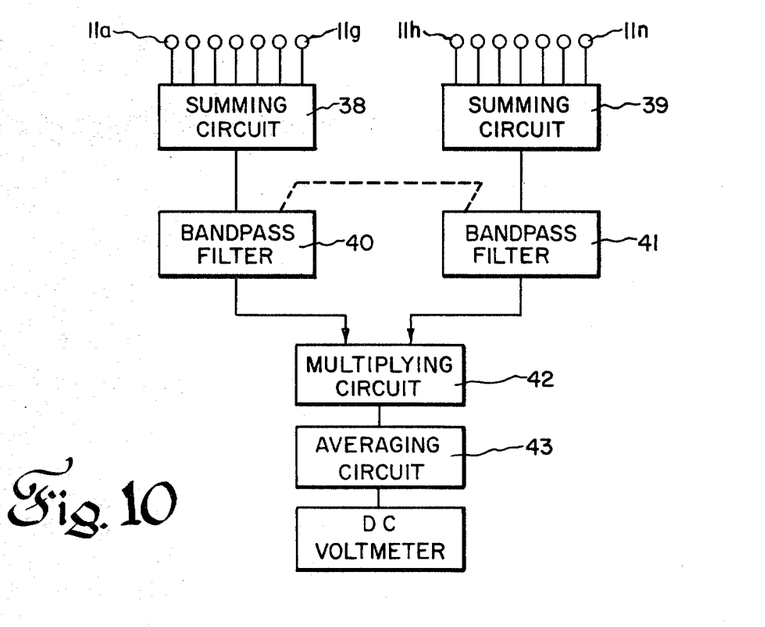
FIG. 10 is a block diagram of an alternate electronic circuit for use with multiplicative arrays.

An alternative technique for processing the received microphone signals in the multiplicative mode is illustrated in FIG. 10. The electronic processing circuit in this case includes a summing circuit 38 for the left side of the array, and an identical summing circuit 39 for the right side of the array, which as before can be an unshaded or a shaded array. The summed outputs of each half of the array are individually filtered by the respective matched bandpass filters 40 and 41, which are exactly matched in phase since phase errors in effect rotate or steer the array. Two narrow-band tracking filters can be slaved together for this purpose. The outputs of the two filters are multiplied by a suitable multiplying circuit 42 and then averaged by a suitable averaging circuit 43. The averaged output is read by a d-c voltmeter or other measuring instrument. The summing circuits 38 and 39 can be implemented as illustrated in dashed lines in FIG. 9. At the outputs of operational amplifiers 30 and 31 are additional input resistors 34' that are connected to the inverting input of an operational amplifier 44. The signal at the output of operational amplifier 44 is the sum for the left side of the array. Similarly, at the right side of the array, the outputs of operational amplifiers 32 and 33 are supplied through additional input resistors 34'' to the inverting input operational amplifier 45. A multiplicative array gives about a 2:1 improvement in bearing resolution if one source stands out in an assemblage of sources, but is not useful in measuring the amplitude of weak sources in the presence of strong interference. Splitting of the array, as shown in FIG. 9, is desirable because it increases the signal processing options without increasing the size or cost of the array.

When the frequency range to be covered is great, two or more curved broadside arrays constructed as herein taught, each optimized for a given frequency range, may be more effective than a single array covering the entire range. For example, for the total frequency range from 800 to 10,000 Hz, the first array can cover the range from 800 to 2,800 Hz while the second covers the range from 2,800 to 10,000 Hz. The second array, of course, has much shorter length than the first. The two arrays, furthermore, require a smaller number of microphones than a single array covering the entire frequency range. A low cost way of changing the length of the array and the microphone spacing in FIGS. 1 and 2 is to move the microphones closer together on the same support structure to halve both array length and microphone spacing. The curvature of the array is also changed readily by providing support posts 16 with adjustable microphone mountings.

In summary, a curved broadside array with a row of transducer elements is used as a highly directive array to measure noise originating in a localized region of an extended noise source. The curved array is usable only at the predetermined range or the nominal range distance. Key equations are given for calculating the length of the array and the minimized number of elements. Although usually referred to herein as a noise source, the technique is applicable generally to any extended sound source, regardless as to the nomenclature used. Among the applications of sound and noise locators of this type are to permit the design of quieter engines and machinery, and to evaluate the effects of acoustical treatment.

While the invention has been particularly shown and described with reference to several preferred embodiments thereof, it will be understood by those skilled in the art that the foregoing and other changes in form and details may be made therein without departing from the spirit and scope of the invention.

What we claim as new and desire to secure by Letters Patent of the United States is:

1. A directive acoustic array for noise source localization comprising
    a curved broadside array for use at a nominal range from an extended noise source and including a row of electroacoustic transducer elements each generating a signal representative of the sensed sound pressure level,
    said array having a curvature substantially conforming to the curvature of the wavefronts of sound waves in the far field incident on said transducer elements, and
    an electronic circuit for processing said signals and producing an output indicative of the noise originating in a localized region of the extended noise source.

2. An acoustic array according to claim 1 wherein said transducer elements are equally spaced transducer elements, and
    the curvature of said array is further defined by an arc of a circle with a radius equal to the range.

3. An acoustic array according to claim 1 further including means for mounting said curved broadside array to scan the extended noise source in azimuth.

4. An acoustic array according to claim 1 wherein said electronic circuit includes bandpass filter means for extracting selected frequency ranges from the transducer element signals.

5. A directive acoustic array for noise source localization comprising
    a curved broadside array for use at a nominal range from an extended noise source and including a single row of equally spaced electroacoustic transducer elements each generating a signal representative of the sensed sound pressure level,
    said array having a curvature defined by an arc of a circle with a radius equal to the range and conforming to the curvature of the wavefronts of sound waves incident on said transducer elements, and
    an electronic circuit for processing said signals including bandpass filter means for extracting selected frequency ranges, said electronic circuit producing an output indicative of the noise originating in a localized region of the extended noise source.

6. An acoustic array according to claim 5 wherein said transducer elements are matched microphones.

7. An acoustic array according to claim 5 wherein said electronic circuit includes summing circuits for obtaining the sum of all of said transducer element signals.

8. An acoustic array according to claim 5 wherein said electronic circuit includes independent summing circuits for respectively obtaining the sum of said signals generated by the two halves of said transducer elements, and a multiplying circuit for multiplying the outputs of said summing circuits.

9. An acoustic array according to claim 5 wherein said electronic circuit includes means for selectively and variably attenuating said transducer element signals to achieve a shaded array with a predetermined amount of said lobe suppression.

10. An acoustic array according to claim 5 wherein the length L of said curved braodside array, which is the length of the arc of the circle with a radius equal to the range, is given approximately by the equation $$L = 0.8\lambda R/Q$$

where $\lambda$ is the wavelength in feet, $R$ is the range in feet, and $Q$ is the lateral dimension of the localized noise source region, in feet.

11. An acoustic array according to claim 5 wherein the spacing of said equally spaced transducer elements is greater than $0.75\lambda$, where $\lambda$ is the wavelength of the sound waves being sensed.

12. An acoustic array according to claim 5 wherein said transducer elements are matched, and the number of transducer elements, $N$, is given by the equation $$N = L/\lambda \; Z/R + 2,$$

where $L$ is the length of the arc of the circle with a radius equal to the range, $Z$ is the length of the extended noise source, $\lambda$ is the wavelength of the sound waves, and $R$ is the range, all in feet.

13. A method of measuring a localized source of sound in a longitudinally extended complex sound source comprising the steps of mounting a curved broadside microphone array at a predetermined range from the extended sound source, said array comprising a single row of equally spaced microphones arranged on an arc of a circle with a radius equal to the range and conforming to the curvature of the wavefronts of incident sound waves, operating said curved broadside array to generate at each microphone a signal representative of the sensed sound pressure level, and processing said signals to produce an output indicative of the sound originating from the localized source of sound within said extended noise source.

14. A method according to claim 13 further including the step of pivoting said array about the array axis to direct said array toward other localized sources of sound within said extended noise source, and operating said array to generate microphone signals and processing said signals to produce outputs indicative of the sound originating from the other localized sources.

15. A method according to claim 13 further including the step of physically moving said curved broadside array to different angular positions with respect to said localized source of sound, and operating said array to generate microphone signals and processing said signals to produce outputs indicative of the sound originating from the localized source as measured from the respective different angular positions of the array.

16. A method according to claim 13 further including the step of bandpass filtering said output by incremental frequency ranges to detect pure tones of sound originating from the localized source.

17. A method according to claim 13 further including the step of bandpass filtering said output to detect sound within a selected frequency range originating from the localized source.

18. A method according to claim 13 wherein said step of processing said microphone signals includes the step of selectively attenuating said signals to achieve a shaded array with a predetermined amount of said lobe suppression.

* * * * *

UNITED STATES PATENT OFFICE
CERTIFICATE OF CORRECTION

Patent No. 3,781,782      Dated December 25, 1973

Inventor(s) Paul F. Scott, Kenneth P. Radecki, Robert B. Tatge

It is certified that error appears in the above-identified patent and that said Letters Patent are hereby corrected as shown below:

At col. 4, line 43, in equation (1), "F" should read -- R --
At col. 5, line 43, equation (2) should read:
$$\theta_{BW} = \frac{180}{\pi} \frac{Q}{R}$$
At col. 6, line 13, equation (4) should read:
$$F(\theta) = \frac{\sin(N\pi D/\lambda \sin\theta)}{\sin(\pi D/\lambda \sin\theta)} \sin\omega t$$
At col. 6, line 24, equation (5) should read:
$$\sin\theta = \frac{(N-1)/N}{D/\lambda}$$
At col. 6, line 30, equation (6) should read:
$$\sin\theta = \frac{(N-1)^2}{NL/\lambda}$$
At col. 6, line 35, equation (7) should read:
$$N = \frac{L}{\lambda}\frac{Z}{R} + 2$$
At col. 6, line 47, equation (8) should read:
$$K \leq \frac{1130}{f} \frac{R^2}{L^2} \text{ feet}$$
Claim 9, line 5, "said lobe" should read -- side lobe --
Claim 12, line 4, "N = L/$\lambda$ Z/R + 2" should read:
$$N = \frac{L}{\lambda}\frac{Z}{R} + 2$$
Claim 18, line 4, "said lobe" should read -- side lobe --

Signed and sealed this 9th day of July 1974.

(SEAL)
Attest:

McCOY M. GIBSON, JR.
Attesting Officer

C. MARSHALL DANN
Commissioner of Patents